Sept. 16, 1958 J. FAHRINGER 2,852,394
FROZEN FOOD THAW INDICATOR
Filed Nov. 23, 1954

INVENTOR.
JERRY FAHRINGER
BY
HIS ATTORNEY.

United States Patent Office

2,852,394
Patented Sept. 16, 1958

2,852,394

FROZEN FOOD THAW INDICATOR

Jerry Fahringer, Phoenixville, Pa.

Application November 23, 1954, Serial No. 470,590

3 Claims. (Cl. 99—192)

This invention relates to frozen foods, and particularly to a thaw indicator for conventional packaged frozen foods.

One sometimes finds, upon opening a package of frozen food, that the contents thereof have become spoiled due to their having thawed some time prior to the purchase thereof, or prior to the use thereof, in the case of frozen foods stored in a home freezer. Not only is such a situation exasperating to the housewife who has already planned her dinner and purchased foods accordingly, but in some instances food poisoning may result when the unwary housewife fails to discard such foods. Thus, not only is the grocer's good will damaged, but he is also subjected to possible legal liability for injuries sustained as a result of the use of these foods.

With the above in mind, it is the basic objective of the present invention to provide a thaw indicator for packaged frozen foods. Such an indicator would tell the purchaser or user of packaged frozen foods, by a mere glance at the food package, that the contents therewithin have reached a temperature above their freezing point, thus suggesting the possibility of their having become spoiled.

It is another object of the present invention to provide a thaw indicator for packaged frozen foods that is readily adaptable to conventional frozen food packages.

It is a further object of the invention to provide a thaw indicator for packaged frozen foods which is the epitome of simplicity and low cost.

These objects, together with other objectives and advantages to be derived from the present invention, will become apparent by reference to the following detailed description and accompanying drawings wherein similar numerals refer to similar parts throughout the several views.

Figure 1:
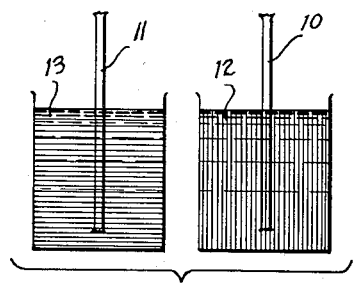
Figure 1 is a diagrammatic view of the first step involved in the manufacture of the frozen food thaw indicator of the present invention, a pair of cords or strings shown being dyed separate colors.

Referring to the drawings, the step-by-step process for the manufacture of the present thaw indicator will now be described in detail, together with the manner in which the said indicator is used.

As shown in Fig. 1, two sections of loosely wound, ordinary cotton cord, 10 and 11, are immersed in a red bath 12 and a blue bath 13, respectively, consisting of conventional vegetable food coloring dissolved in water. Loosely wound cotton cord is preferred due to its high absorbent qualities, while vegetable coloring is used in view of its nontoxic nature.

Figure 2:
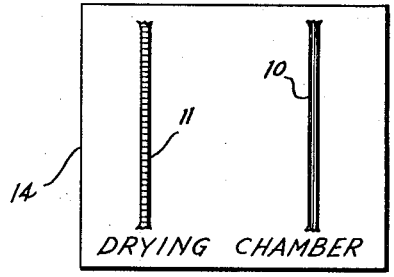
Figure 2 illustrates, diagrammatically, the cords of Fig. 1 being dried.
Figure 3:
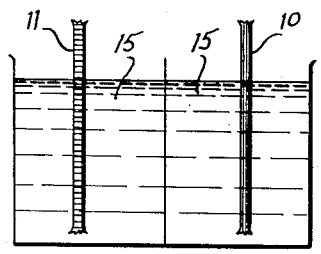
Figure 3 depicts, diagrammatically, the dried, dyed cords of Fig. 2 being immersed in a special bath.

After the cords 10 and 11 are thoroughly saturated with the red and blue baths, respectively, they are passed through a heated drying chamber 14, as in Fig. 2, so as to remove all moisture therefrom. When the said colored cords 10 and 11 are completely dry, they are next immersed in a bath 15, shown in Fig. 3, consisting of a liquid whose freezing point is the same as, or slightly lower than, the freezing point of the particular food with which the indicator is to be used. As a margin of safety, it may be desirable that the said liquid have a freezing point approximately 5° F. lower than the said food. An appropriate mixture of water and alcohol or other suitable liquid may be used for the bath. It will be noted that the cords 10 and 11 are both immersed in the same bath 15, but in separate chambers so as to preclude any intermingling of the colors.

Figure 4:
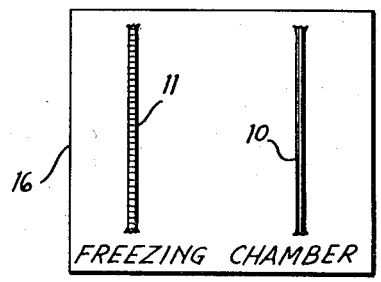
Figure 4 is another diagrammatic view showing the cords being passed through a freezing chamber to freeze the bath liquid thereon.

After the colored cords 10 and 11 have been thoroughly saturated with the bath 15, they are passed through a freezing chamber 16, as in Fig. 4, where the bath 15 in and about the said cords is quickly crystallized. Next, the two colored cords, with the bath 15 crystallized thereon, are wound together in the manner shown in Fig. 5, producing a unit length of twisted bicolored cord 17. The said bicolored cord 17 is then mounted on a small white card 18 by means of staples 19 or other suitable attachment means, the said card 18 preferably having an absorbent surface for a purpose to be described below. The indicator is now ready for mounting on a frozen food package.

Figures 5, 6, 8:
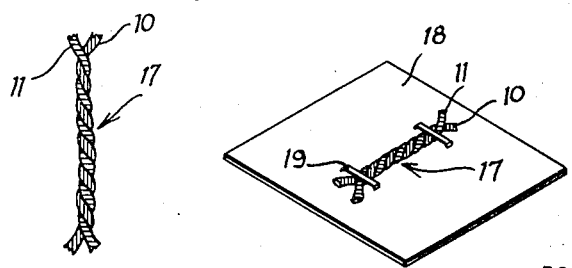
Figure 5 illustrates the separate cords as being twisted into a unitary cord.
Figure 6 is a perspective view showing the twisted cords mounted upon an indicator card.
Figure 8 is a cross-sectional view of the frozen food package, with parts broken away, taken along the line 8—8 of Fig. 7.
Figure 7:
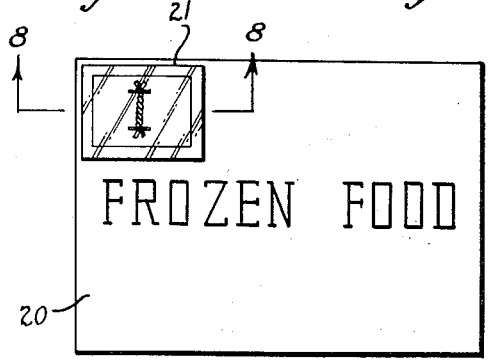
Figure 7 is a diagrammatic plan view of a conventional package of frozen food showing the thaw indicator of the present invention in association therewith.
Figure 9:
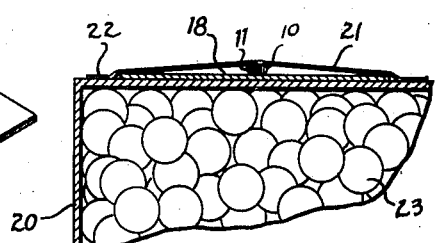
Figure 9 is an enlarged plan view of a portion of the indicator card, illustrating how the condition of thaw is indicated.

Turning now to Figs. 7 and 8, it will be seen that the card 18 with the bicolored cord 17 thereon is placed in the upper left-hand corner of the front surface of a package 20 of frozen food. Then, a transparency 21 having slightly larger dimensions than said card 18, and having glued marginal edges 22, is placed over the said card with the glued edges sticking fast to the package 20. The transparency 21 is preferably made from a moisture-resistant material such as vinyl chloride film, or the like, so that the moist atmosphere with the food storage freezer will not reach the bicolored cord 17 for a reason which will soon become apparent.

*Operation*

With the card 18 mounted on the front or top surface of a package of frozen foods in the manner described above, the said package may be placed in a conventional frozen food showcase for sale, or in a home freezer, as the case may be. It is to be remembered that the freezing point of the bath 15 on the cords 10 and 11 of the bicolored cord 17 is the same as or slightly less than the freezing point of the particular food within the package. Purely by way of illustration, peas are depicted at 23 in Fig. 8. Now, should the temperature in the showcase freezer or home freezer rise to a point above the freezing point of the bath 15, the frozen crystals of said bath on or about the cords 10 and 11 will melt. When this happens, the red and blue vegetable colors in the cords 10 and 11, respectively, will run and mix with each other, producing a new color, purple, resulting in a cord 24 of a unitary purple color. In addition, due to the absorbent quality of the card 18, a purple blot 25 will readily appear about the new purple cord 24. Thus, when such a color change appears, it is evident to the prospective purchaser of the frozen package, or the prospective user thereof, that the temperature of the contents therewithin has risen to a point above their freezing point, advising him of the possibility of said contents having become spoiled.

As a modification of the above-described indicator, it may be desirable to make the card 18 from aluminum foil instead of an adsorbent material. Aluminum being a good conductor would readily reach the same temperature as the food package, insuring that the bicolored cord 17 reached the same temperature as the said package. A more accurate indicator would result.

It is thus seen from the above description of the present invention, that a novel and simple device is provided for indicating that a package of frozen foods has become thawed. Needless to say, much is to be gained by the grocer from this indication, particularly in the prevention of potential damage to the good will of his business and the substantial elimination of possible legal liability from litigation-prone customers. And due to the simplicity of the indicator, it may be produced with a minimum of cost. It will also be noted that all elements of the indicator are non-toxic.

While the present description of this indicator has been discussed in terms of red and blue cords dyed with vegetable coloring, other combinations of colors, such as yellow and blue, and the like, may be used with equal success.

Although the present discussion has been limited to the above-described preferred embodiment, variations thereof are possible without departing from the scope of the invention. It is to be understood, therefore, that the invention is not to be limited to the particular embodiment disclosed, but rather only to the inventive concept as defined by the appended claims.

What is claimed is:

1. A thaw indicator for use on packages containing frozen foods comprising, a pair of individual adsorbent cords twisted together into a unit length of cord, the said cords each having frozen crystals of a liquid bath thereon which have a melting point equivalent to the freezing point of the frozen food, each of said cords and its associated crystals containing a vegetable dye which is of a different color than that of the other cord and its associated crystals, the different color dyes of said cords and crystals being adapted to merge and form a new color when the crystals thereon melt.

2. A thaw indicator for use on packages containing frozen foods comprising, a sheet adapted to be positioned with one face in engagement with a frozen food package, a pair of individual absorbent cords twisted together into a unit length of cord and secured in engagement with said sheet, the said cords each having frozen crystals of a liquid bath thereon which have a melting point equivalent to the freezing point of the frozen food, each of said cords and its associated crystals containing a vegetable dye which is of a different color than that of the other cord and its associated crystals, and a moisture-resistant transparent covering over said twisted cords and sheet, the different color dyes of said cords being adapted to merge and form a new color when the crystals thereon melt.

3. A thaw indicator for use on packages containing frozen foods comprising, a sheet of aluminum foil, a pair of individual adsorbent cords twisted together into a unit length of cord and mounted on said sheet, the said cords each having frozen crystals of a liquid bath thereon which have a melting point equivalent to the freezing point of the frozen food, each of said cords and its associated crystals containing a vegetable dye which is of a different color than that of the other cord and its associated crystals, and a moisture-resistant transparent covering over said twisted cords and sheet, the different color dyes of said cords being adapted to merge and form a new color when the crystals thereon melt.

References Cited in the file of this patent

UNITED STATES PATENTS

| | | |
|---|---|---|
| 1,535,536 | MacDonald | Apr. 28, 1925 |
| 2,460,215 | Chase | Jan. 25, 1949 |
| 2,662,018 | Smith | Dec. 8, 1953 |